United States Patent
Southworth et al.

(10) Patent No.: US 12,446,857 B2
(45) Date of Patent: Oct. 21, 2025

(54) MULTISCALE ULTRASOUND TRACKING AND DISPLAY

(71) Applicant: Excera Inc., Minneapolis, MN (US)

(72) Inventors: Michael K. Southworth, St. Louis, MO (US); Christopher Michael Andrews, Chesterfield, MO (US); Ignacio Soriano, Madrid (ES); Alexander Bair Henry, St. Louis, MO (US); Jonathan R. Silva, St. Louis, MO (US); Jennifer N. Avari Silva, St. Louis, MO (US)

(73) Assignee: Excera Inc., Minneapolis, MN (US)

( * ) Notice: Subject to any disclaimer, the term of this patent is extended or adjusted under 35 U.S.C. 154(b) by 111 days.

(21) Appl. No.: 17/740,191

(22) Filed: May 9, 2022

(65) Prior Publication Data

US 2022/0354462 A1    Nov. 10, 2022

Related U.S. Application Data

(60) Provisional application No. 63/186,393, filed on May 10, 2021.

(51) Int. Cl.
 *A61B 8/00* (2006.01)
 *A61B 90/00* (2016.01)

(52) U.S. Cl.
 CPC .............. *A61B 8/462* (2013.01); *A61B 8/463* (2013.01); *A61B 8/468* (2013.01); *A61B 8/469* (2013.01); *A61B 2090/365* (2016.02)

(58) Field of Classification Search
 CPC ......... A61B 8/462; A61B 8/463; A61B 8/468; A61B 8/469; A61B 8/4254; A61B 8/4472; A61B 8/0841; A61B 2090/365
 See application file for complete search history.

(56) References Cited

U.S. PATENT DOCUMENTS

| 6,122,538 | A | 9/2000 | Sliwa et al. |
| 6,216,029 | B1 * | 4/2001 | Paltieli .................. A61B 34/20 600/461 |

(Continued)

FOREIGN PATENT DOCUMENTS

| DE | 102016203809 A1 | 9/2017 |
| DE | 102016203812 A1 | 9/2017 |

(Continued)

OTHER PUBLICATIONS

Kanithi et al., "Immersive Augmented Reality System for Assisting Needle Positioning During Ultrasound Guided Intervention", 2016 (Year: 2016).*

(Continued)

*Primary Examiner* — Adil Partap S Virk
(74) *Attorney, Agent, or Firm* — Fenwick & West LLP

(57) ABSTRACT

In an embodiment, a system receives data from a first electromagnetic sensor coupled to a head-mounted display (HMD) and detecting an electromagnetic field generated by an electromagnetic reference source coupled to an ultrasound probe. The system receives data from a second electromagnetic sensor coupled to a medical instrument and detecting the electromagnetic field. The system determines a position of the HMD relative to the ultrasound probe. The system determines a position of the medical instrument relative to the ultrasound probe. The system generates a visualization of a path of the medical instrument oriented relative to an ultrasound image plane. The system provides a graphic for display by the HMD to a user wearing the HMD, where the graphic includes the visualization and image data captured by the ultrasound probe displayed on the ultrasound image plane.

18 Claims, 10 Drawing Sheets

(56) References Cited

U.S. PATENT DOCUMENTS

| | | | |
|---|---|---|---|
| 6,612,991 B2 | 9/2003 | Sauer et al. | |
| 6,689,067 B2 | 2/2004 | Sauer et al. | |
| 6,733,458 B1* | 5/2004 | Steins | A61B 8/4254 |
| | | | 600/461 |
| 7,239,330 B2 | 7/2007 | Sauer et al. | |
| 7,251,352 B2 | 7/2007 | Sauer et al. | |
| 8,460,190 B2 | 6/2013 | Jackson et al. | |
| 9,251,721 B2 | 2/2016 | Lampotang et al. | |
| 9,675,319 B1* | 6/2017 | Razzaque | A61B 6/037 |
| 10,231,753 B2 | 3/2019 | Burnside et al. | |
| 10,292,768 B2 | 5/2019 | Lang | |
| 10,453,360 B2 | 10/2019 | Beudeker et al. | |
| 10,602,114 B2 | 3/2020 | Casas | |
| 2005/0085717 A1* | 4/2005 | Shahidi | A61B 34/20 |
| | | | 600/443 |
| 2006/0176242 A1 | 8/2006 | Jaramaz et al. | |
| 2007/0073155 A1* | 3/2007 | Park | A61B 8/0833 |
| | | | 600/461 |
| 2007/0276247 A1 | 11/2007 | Chalana et al. | |
| 2010/0298705 A1* | 11/2010 | Pelissier | A61B 8/4254 |
| | | | 600/443 |
| 2011/0130641 A1* | 6/2011 | Razzaque | A61B 8/5238 |
| | | | 600/407 |
| 2011/0137156 A1* | 6/2011 | Razzaque | A61B 34/20 |
| | | | 600/424 |
| 2011/0208052 A1* | 8/2011 | Entrekin | A61B 8/467 |
| | | | 600/437 |
| 2011/0245670 A1* | 10/2011 | Tashiro | A61B 8/466 |
| | | | 600/443 |
| 2011/0251483 A1* | 10/2011 | Razzaque | A61B 6/032 |
| | | | 600/424 |
| 2012/0078103 A1* | 3/2012 | Tashiro | A61B 8/461 |
| | | | 600/443 |
| 2012/0179038 A1* | 7/2012 | Meurer | A61B 8/463 |
| | | | 600/443 |
| 2013/0072786 A1 | 3/2013 | Keogh et al. | |
| 2013/0079627 A1 | 3/2013 | Lee | |
| 2013/0195313 A1* | 8/2013 | Gauthier | A61B 8/0833 |
| | | | 382/103 |
| 2013/0197357 A1* | 8/2013 | Green | A61B 90/361 |
| | | | 600/424 |
| 2013/0218024 A1* | 8/2013 | Boctor | A61B 8/4416 |
| | | | 600/476 |
| 2013/0267838 A1* | 10/2013 | Fronk | A61B 5/064 |
| | | | 600/424 |
| 2014/0031674 A1* | 1/2014 | Newman | A61B 5/283 |
| | | | 600/424 |
| 2014/0218366 A1* | 8/2014 | Kosmecki | G06T 11/60 |
| | | | 345/426 |
| 2014/0364728 A1* | 12/2014 | Hashimoto | A61B 8/0841 |
| | | | 600/437 |
| 2015/0173706 A1* | 6/2015 | Andrews | A61B 8/463 |
| | | | 600/424 |
| 2015/0257735 A1* | 9/2015 | Ball | A61B 8/462 |
| | | | 600/443 |
| 2016/0081666 A1* | 3/2016 | Deguchi | A61B 8/0841 |
| | | | 600/424 |
| 2016/0199024 A1* | 7/2016 | Takeda | A61B 8/5215 |
| | | | 600/424 |
| 2016/0225192 A1* | 8/2016 | Jones | G06T 19/20 |
| 2016/0270862 A1 | 9/2016 | Fuchs et al. | |
| 2016/0374644 A1* | 12/2016 | Mauldin, Jr. | A61B 8/085 |
| | | | 600/424 |
| 2017/0135760 A1* | 5/2017 | Girotto | A61B 34/20 |
| 2017/0202633 A1 | 7/2017 | Liu | |
| 2017/0360395 A1 | 12/2017 | Razzaque et al. | |
| 2017/0360402 A1 | 12/2017 | de Jonge et al. | |
| 2017/0367766 A1* | 12/2017 | Mahfouz | A61B 17/1703 |
| 2018/0020992 A1* | 1/2018 | Guo | A61B 8/483 |
| | | | 600/424 |
| 2018/0049622 A1 | 2/2018 | Ryan et al. | |
| 2018/0344286 A1 | 12/2018 | Mienkina et al. | |
| 2019/0133696 A1* | 5/2019 | Spero | A61B 8/0841 |
| 2019/0216547 A1 | 7/2019 | Heaney et al. | |
| 2019/0223757 A1 | 7/2019 | Durfee | |
| 2019/0223958 A1* | 7/2019 | Kohli | A61B 8/4427 |
| 2019/0307419 A1 | 10/2019 | Durfee | |
| 2019/0307518 A1* | 10/2019 | Schotzko | A61B 8/0841 |
| 2019/0339525 A1* | 11/2019 | Yanof | G02B 27/0172 |
| 2019/0380790 A1 | 12/2019 | Fuchs et al. | |
| 2020/0074737 A1* | 3/2020 | Lisse | A61B 8/4254 |
| 2020/0187826 A1* | 6/2020 | Huffer | A61B 8/467 |
| 2020/0352655 A1* | 11/2020 | Freese | G06T 11/00 |
| 2020/0390416 A1* | 12/2020 | Swan | A61B 8/12 |
| 2021/0045715 A1* | 2/2021 | Mauldin | G16H 50/20 |
| 2023/0248441 A1* | 8/2023 | Perez Filho | A61B 90/361 |
| | | | 600/424 |

FOREIGN PATENT DOCUMENTS

| | | |
|---|---|---|
| EP | 3640949 A1 | 4/2020 |
| JP | 2019 520859 A | 7/2019 |
| JP | 2019/177134 A | 10/2019 |
| WO | WO 2008/146207 A3 | 1/2009 |
| WO | WO 2016/112383 A1 | 7/2016 |
| WO | WO-2016/176452 A1 | 11/2016 |
| WO | WO 2020/086912 A1 | 4/2020 |
| WO | WO 2020/210532 A1 | 10/2020 |
| WO | WO 2021/087027 A1 | 5/2021 |
| WO | WO 2021/211570 A1 | 10/2021 |

OTHER PUBLICATIONS

Ameri et al., "Development and Evaluation of an Augmented Reality Ultrasound Guidance System for Spinal Anesthesia: Preliminary Results", 2019 (Year: 2019).*

BD, "Vascular Access Management," date unknown, ten pages, [Online] [Retrieved on Mar. 27, 2023] Retrieved from the Internet <URL: https://www.bd.com/en-us/products-and-solutions/solutions/vascular-access-management>.

GE Healthcare, "Logiq™ E10 Ultrasound," date unknown, 12 pages, [Online] [Retrieved on Mar. 27, 2023] Retrieved from the Internet <URL: https://www.gehealthcare.com/products/ultrasound/logiq/logiq-e10>.

Incremed, "Incremed," date unknown, seven pages, [Online] [Retrieved on Mar. 27, 2023] Retrieved from the Internet <URL: https://www.incremed.com/>.

Inneroptic Technology, Inc., "3D Needle Navigation: Simpler, Safer, More Effective™," date unknown, two pages, [Online] [Retrieved on Mar. 27, 2023] Retrieved from the Internet <URL: https://www.inneroptic.com/>.

PCT International Search Report and Written Opinion, PCT Application No. PCT/US2022/028384, Aug. 3, 2022, 16 pages.

Qian, L. et al., "A Review of Augmented Reality in Robotic-Assisted Surgery," in IEEE Transactions on Medical Robotics and Bionics, vol. 2, Issue. 1, Feb. 2020, pp. 1-16.

Röger, C. et al., "Ultrasound in augmented reality: a mixed-methods evaluation of head-mounted displays in image-guided interventions," International Journal of Computer Assisted Radiology and Surgery, vol. 15, Jul. 2020, pp. 1895-1905.

European Patent Office, Extended European Search Report and Opinion, EP Patent Application No. EP 22808136.0, Feb. 5, 2025, eight pages.

* cited by examiner

900

```
┌─────────────────────────────────────────┐
│ Receive data from a first electromagnetic sensor │
│         coupled to a HMD                │
│                910                      │
└─────────────────────────────────────────┘
                    │
                    ▼
┌─────────────────────────────────────────┐
│ Receive data from a second electromagnetic │
│   sensor coupled to a medical instrument │
│                920                      │
└─────────────────────────────────────────┘
                    │
                    ▼
┌─────────────────────────────────────────┐
│  Determine position of the HMD relative to a │
│ ultrasound probe by processing the data from │
│       the first electromagnetic sensor  │
│                930                      │
└─────────────────────────────────────────┘
                    │
                    ▼
┌─────────────────────────────────────────┐
│  Determine position of the medical instrument │
│ relative to a ultrasound probe by processing the │
│ data from the second electromagnetic sensor │
│                940                      │
└─────────────────────────────────────────┘
                    │
                    ▼
┌─────────────────────────────────────────┐
│ Generate a visualization of a path of the medical │
│  instrument oriented relative to an ultrasound │
│              image plane                │
│                950                      │
└─────────────────────────────────────────┘
                    │
                    ▼
┌─────────────────────────────────────────┐
│     Provide a graphic for display by the HMD │
│                960                      │
└─────────────────────────────────────────┘
```

FIG. 9

MULTISCALE ULTRASOUND TRACKING AND DISPLAY

CROSS REFERENCE TO RELATED APPLICATIONS

This application claims the benefit of priority to U.S. Provisional Application No. 63/186,393, filed on May 10, 2021, which is incorporated herein by reference in its entirety for all purposes.

BACKGROUND

1. Technical Field

This disclosure generally relates to display and annotation of information during ultrasound-involved procedures within a medical environment.

2. DESCRIPTION OF THE RELATED ART

In medical procedures involving ultrasound imaging, one or more operators working in a controlled or sterile environment combine sensed imaging information with directly observable physical information to complete a medical procedure. The translation, combination, and interpretation of directly and indirectly observable procedure information presents obstacles to efficient and effective completion of the medical procedure.

In some cases, the performing physician must maintain sterility during the procedure. In some cases, with or without sterility, the physician must maintain direct physical control of the ultrasound and other procedural instruments for the duration of the medical procedure. Aspects of setup, configuration, control, and/or display of medical procedure information may need to be accessible during some or all stages of the medical procedure. The requirements for sterility or direct control of instruments may preclude the ability of performing personnel to perform critical tasks once the procedure has commenced without stopping the procedure and/or eliciting the support of additional personnel to perform the task under guidance of the performing personnel using conventional medical information system interfaces, e.g., keyboard, mouse, joystick, or physical buttons.

SUMMARY

Embodiments of the present invention provide a system to track, configure, and display any number of imaging data with any number of instrument information. In an embodiment, a method includes receiving data from a first electromagnetic sensor coupled to a head-mounted display (HMD) and detecting an electromagnetic field generated by an electromagnetic reference source coupled to an ultrasound probe. The method further includes receiving data from a second electromagnetic sensor coupled to a medical instrument and detecting the electromagnetic field. The method further includes determining a position of the HMD relative to the ultrasound probe by processing the data from the first electromagnetic sensor. The method further includes determining a position of the medical instrument relative to the ultrasound probe by processing the data from the second electromagnetic sensor. The method further includes generating a visualization of a path of the medical instrument oriented relative to an ultrasound image plane based at least in part on the position of the HMD and the position of the medical instrument. The method further includes providing a graphic for display by the HMD to a user wearing the HMD, the graphic including the visualization and image data captured by the ultrasound probe displayed on the ultrasound image plane.

In an embodiment, the method further comprises receiving data from a third electromagnetic sensor coupled to the HMD and detecting the electromagnetic field generated by the electromagnetic reference source coupled to the ultrasound probe; and determining an orientation of the HMD based on a differential signal between the first magnetic sensor and the second magnetic sensor by processing the data from the first electromagnetic sensor and the data from the third electromagnetic sensor. In an embodiment, the orientation of the HMD is further determined based on data captured by an inertial measurement unit of the HMD.

In an embodiment, the method further comprises determining an orientation of the medical instrument by aggregating data captured by an inertial measurement unit of the medical instrument and the data from the second electromagnetic sensor.

In an embodiment, the method further comprises determining a position of the ultrasound probe by processing image data captured by an imaging sensor of the HMD, wherein the graphic is displayed to the user at an offset from the position of the ultrasound probe.

In an embodiment, the method further comprises determining an offset distance between a tip of the medical instrument and a position of the second electromagnetic sensor coupled to a medical instrument, wherein the visualization is generated based on the offset distance.

In an embodiment, the method further comprises determining a first transformation to map a first coordinate system of the medical instrument to a second coordinate system of the ultrasound probe; and determining a second transformation to map a third coordinate system of the HMD to the second coordinate system of the ultrasound probe, wherein the visualization is generated using the first transformation and the second transformation.

In another embodiment, a system includes an electromagnetic reference source configured to be coupled to an ultrasound probe and generate an electromagnetic field; a first electromagnetic sensor configured to be coupled to a head-mounted display (HMD) and detect the electromagnetic field; a second electromagnetic sensor configured to be coupled to a medical instrument and detect the electromagnetic field; and a non-transitory computer-readable storage medium storing instructions, the instructions when executed by one or more processors cause the one or more processors to: determine a position of the HMD relative to the ultrasound probe by processing data from the first electromagnetic sensor; determine a position of the medical instrument relative to the ultrasound probe by processing data from the second electromagnetic sensor; generate a visualization of a path of the medical instrument oriented relative to an ultrasound image plane based at least in part on the position of the HMD and the position of the medical instrument; and provide a graphic for display by the HMD to a user wearing the HMD, the graphic including the visualization and image data captured by the ultrasound probe displayed on the ultrasound image plane.

In an embodiment, the system further comprises the ultrasound probe, the HMD, and the medical instrument. In an embodiment, the first electromagnetic sensor and the second electromagnetic sensor are wireless. In an embodiment, the medical instrument is a needle, cannula, biopsy device, or ablation device.

In another embodiment, a method includes receiving image data of an ultrasound image plane. The method further includes determining a position of a medical instrument relative to the ultrasound image plane. The method further includes determining an orientation of the medical instrument relative to the ultrasound image plane. The method further includes determining a trajectory of the medical instrument based on the position and the orientation of the medical instrument. The method further includes displaying, by a head-mounted display (HMD), an instrument path indicating the trajectory of the medical instrument. The method further includes determining that the medical instrument has reached an intersection point on the ultrasound image plane based on an updated position of the medical instrument along the trajectory. The method further includes displaying, by the HMD, an updated version of the instrument path indicating that the medical instrument has reached the intersection point on the ultrasound image plane.

In various embodiments, a non-transitory computer-readable storage medium stores instructions that when executed by one or more processors cause the one or more processors to perform steps of any of the methods described herein.

BRIEF DESCRIPTION OF DRAWINGS

FIG. 9 is a flowchart of a process for tracking an instrument using multiple sensors according to various embodiments.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Environment

Figure 1:
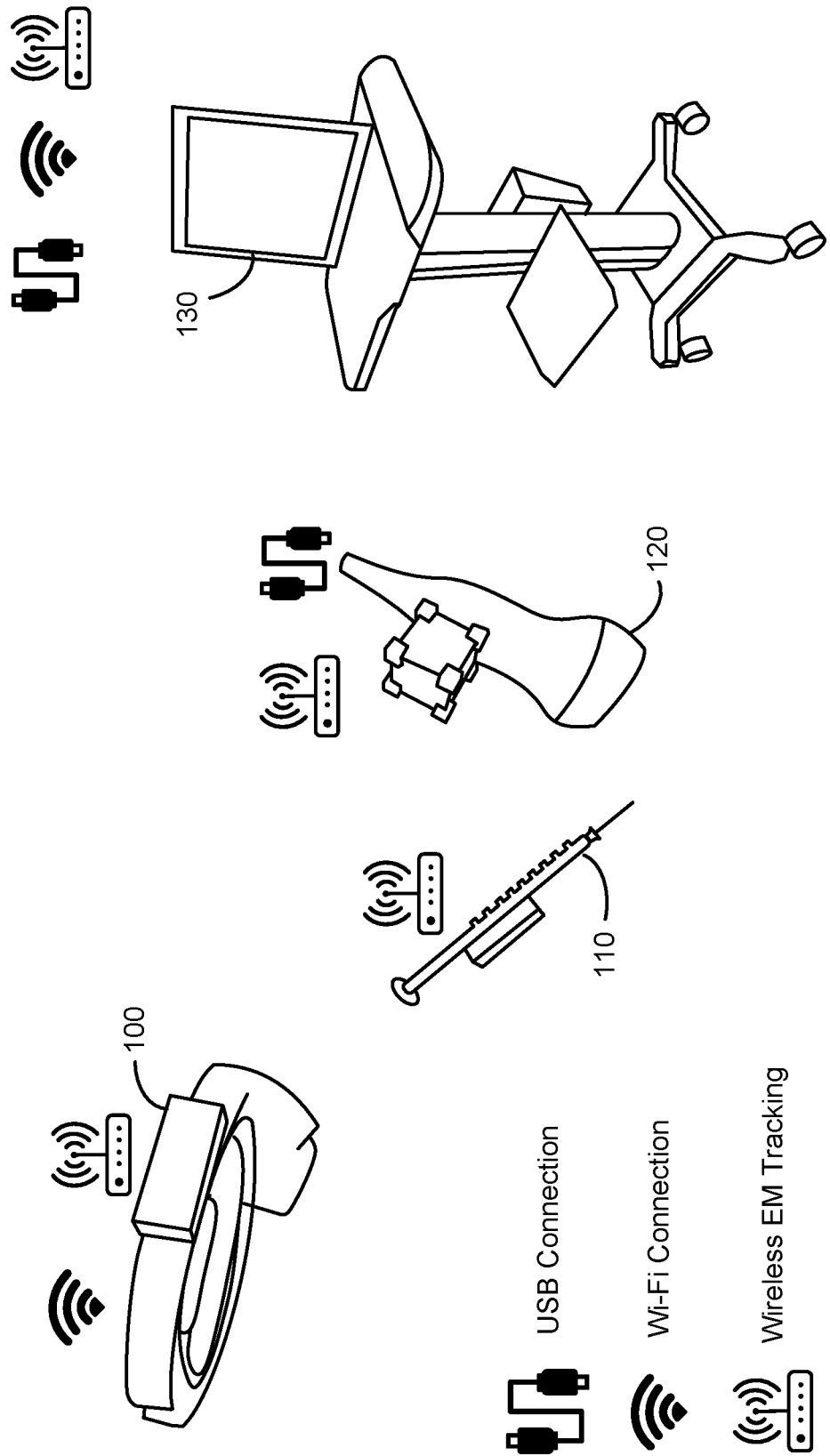
FIG. 1 illustrates an example system environment of a processing system for ultrasound imaging and device tracking according to various embodiments.
Figure 2:
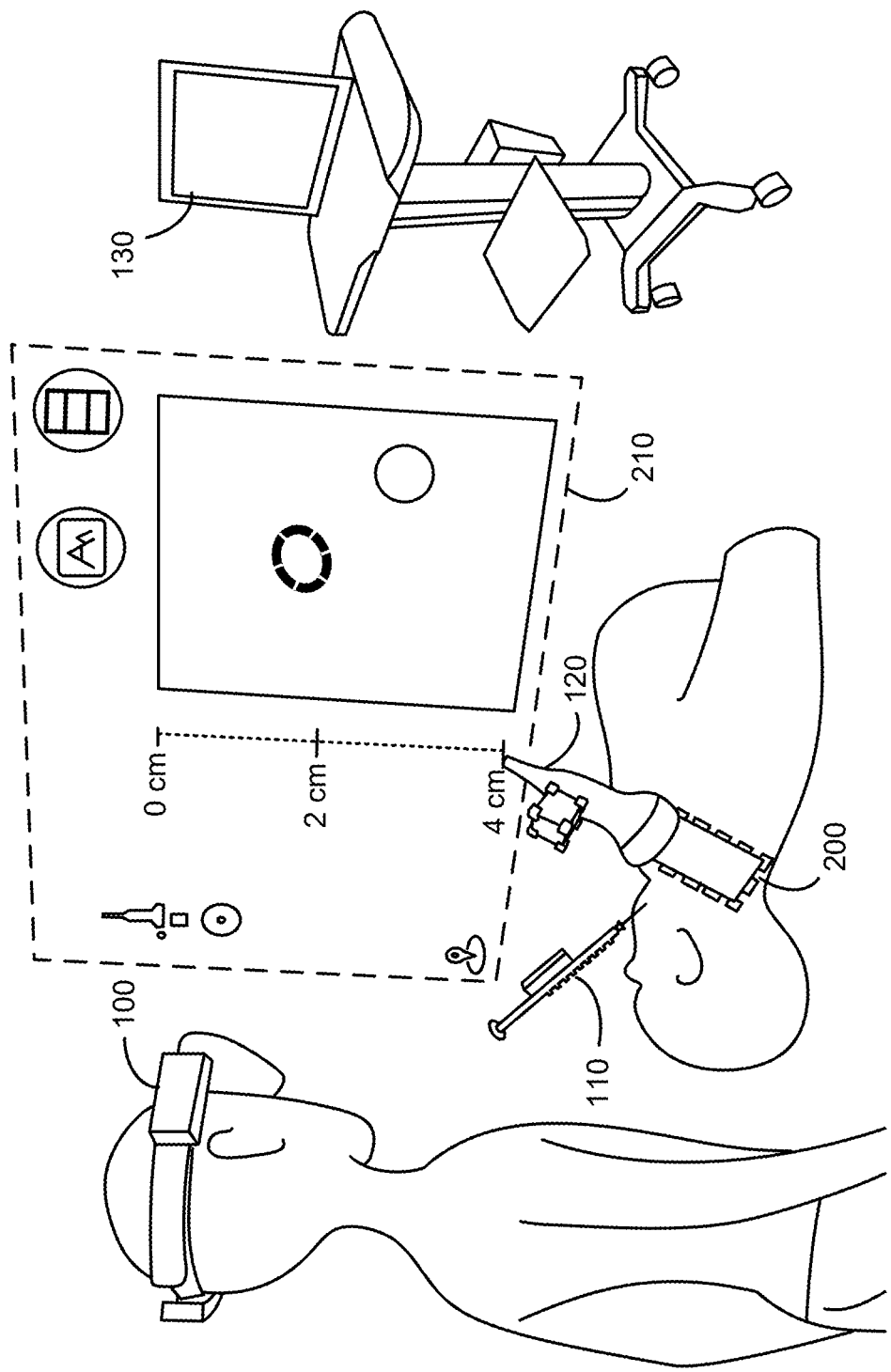
FIG. 2 illustrates an example graphical user interface for ultrasound imaging according to various embodiments.

FIG. 1 illustrates an example system environment of a processing system for ultrasound imaging according to various embodiments. FIG. 2 illustrates an example graphical user interface for ultrasound imaging according to various embodiments. In various embodiments, the system includes one or more of: a head-mounted display (HMD) device 100, an instrument 110 (e.g., a needle, cannula for inserting a device into a vessel, biopsy device, or ablation device), an ultrasound probe 120, and an optional display 130. The system may also include one or more of: a user input method, any number of configurable sources of ultrasound information, any number of configurable sources of instrument tracking information, a means of communication between the devices, a processor, and a storage device. Means of communication include any number of combinations of wireless and wired communication.

Sources of ultrasound information may be from multiple physical devices, or the same physical device from different times, configurations, and positions within the procedure. Image information may also be derived from other imaging modalities such as computed tomography (CT) or magnetic resonance imaging (MM). In various embodiments, a source of ultrasound information is an ultrasound probe 120.

Sources of tracking information include local or global positioning sensors including electromagnetic (EM), optical, ultrasound, inertial, magnetometers, accelerometers, or global positioning system (GPS) sensors. In various embodiments, an electromagnetic source may be coupled (e.g., rigidly coupled) to the ultrasound probe 120; additionally, electromagnetic sensors are coupled (e.g., rigidly coupled) to the HMD 100 and instrument 110. As a result, the processing system can use data from the electromagnetic sensors to track position and orientation of the HMD 100 and instrument 110 relative to the electromagnetic source of the ultrasound probe 120.

The HMD 100 provides a means for a user to view or interact with ultrasound image information or instrument information, which may be presented to the user as a heads-up display or an augmented reality display. An example HMD is the HOLOLENS by MICROSOFT.

Display of procedure information is achieved through the HMD 100 and may be displayed as a projection 200 at the location of the source of information responsive to the tracking of the processing system. In the example shown in FIG. 2, the ultrasound information is displayed in a projection 200 at the tip of the ultrasound probe in the tracked ultrasound imaging plane ("probe tip display"). In another aspect, the ultrasound information may also be displayed at a configurable offset from the tool tip in the same orientation (or in a rotated configuration) to prevent obscuring the working area of the physician ("probe locked display"). Additionally, any additional tracked instruments may be displayed in the tracked orientation and position ("pose") relative to the sensed ultrasound. This additional instrument information includes current orientation and position, projected orientation and position if advanced along current trajectory, distance to intersection of the instrument, and angle of intersection, responsive to the tracking information of the system.

In another aspect, the ultrasound and instrument information may be displayed responsive to the position of the tool tip with fixed orientation relative to the wearer ("billboarded"). In the example shown in FIG. 2, the HMD 100 presents a billboarded display to the user as a heads-up display 210. In an aspect, 3D needle tip pose is displayed directly in 3D overlaid on the ultrasound image to intuitively convey distance, size, and angle of the needle with respect to the image plane. The billboarded display can also show a projected needle trajectory and intersection with the image plane. In another aspect, a 2D or 3D annotation is overlaid in the image plane to translate the distance of the needle to the image plane in the image, which is further described with respect to FIGS. 6-8.

In some embodiments, the ultrasound and instrument pose, distance, and/or intersection information may additionally be displayed either anchored in the virtual environment of the HMD 100, or on physical display device 130 in the medical environment through traditional techniques of rendering 3D content to 2D displays. Tracked information of HMD 100, instrument 110, and ultrasound probe 120 may be used to automatically orient or flip the image to display in the correct perspective in billboarded display, probe tip display, and probe locked display.

Tracking of devices is achieved through the combination of an ensemble of multiple sources of tracking information of different spatial and temporal resolutions. Devices include the HMD 100, ultrasound image source (e.g., the ultrasound probe 120), and one or more medical instruments 110. Each tracking information source provides any number of tracking information updates in position, orientation, and corresponding velocities and accelerations at differing resolutions and differing update rates. In one embodiment, different electromagnetic tracking sensors are attached to the HMD 100 and instrument 110, and an electromagnetic reference source is attached to an ultrasound probe 120. The distance between the ultrasound reference source on the ultrasound probe 120 and the instrument 110 is reduced or minimized to improve accuracy between the ultrasound source and HMD, e.g., due to lower noise in the EM sensor data. Any number of additional electromagnetic sensors or reference sources may provide additional sources of tracking information to improve tracking accuracy.

Figure 3:
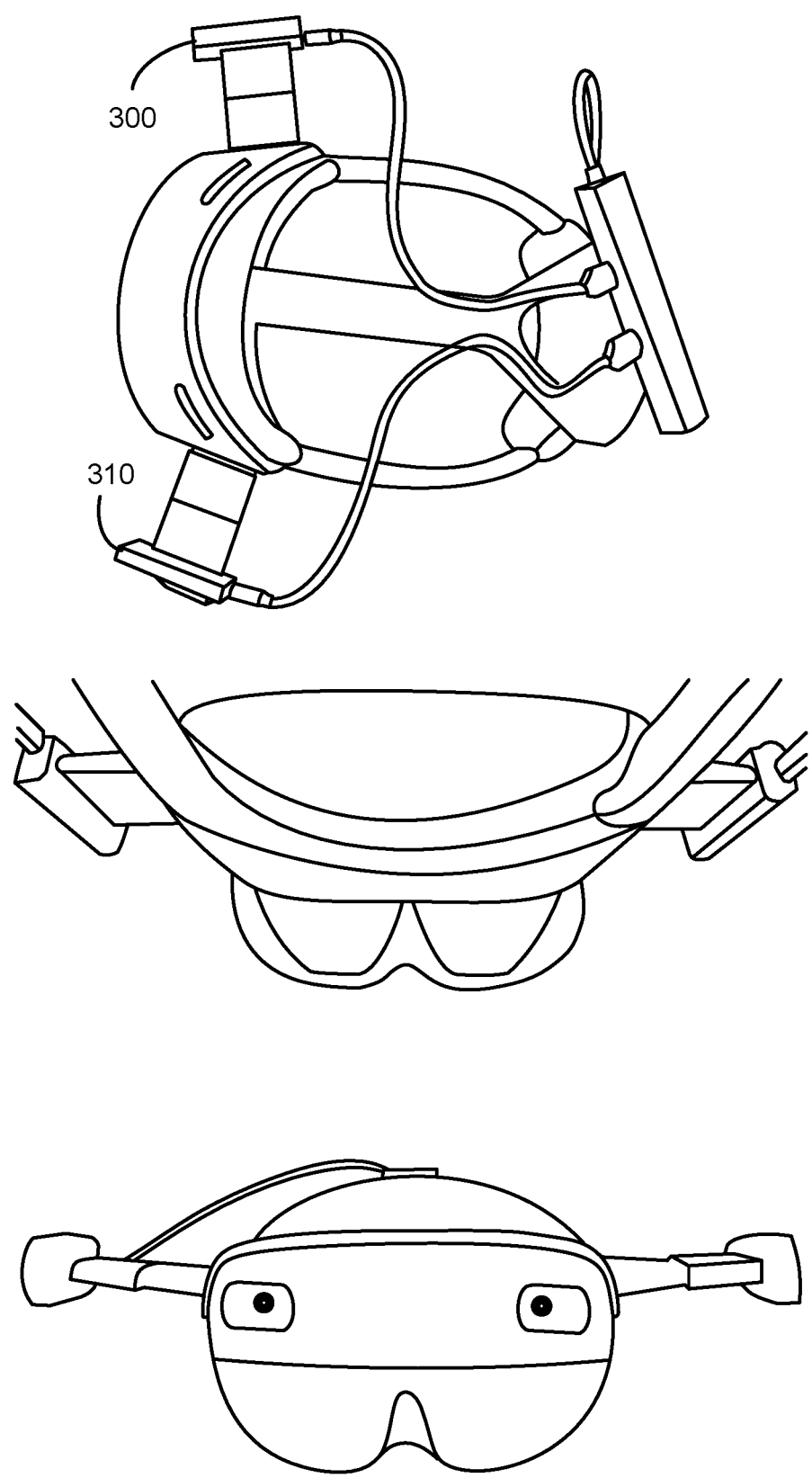
FIG. 3 illustrates sensor positions on a head-mounted display according to various embodiments.

FIG. 3 illustrates sensor positions on a head-mounted display 100 according to various embodiments. In some embodiments, one or more electromagnetic sensors or antennae are coupled to the HMD 100 to improve the processing system's determination of angular and distance accuracy between the HMD 100 and an electromagnetic reference source. In the example shown in FIG. 3, the HMD 100 includes a right electromagnetic sensor 300 and a left electromagnetic sensor 310. Registration and calibration of tracking systems of different spatial and temporal resolution is achieved through rigid transformation of different sensors or calibration through a reference data set.

In one embodiment, multiple sensors are affixed to a rigid body with known or measurable distances and orientations between the sensors to allow the combination of information from each measurement frame of reference. One example of this is rigid transformation from an electromagnetic sensor affixed to the HMD 100 to the camera measurement frame of reference. Another example of this is an optical tracking marker (e.g., QR code of known scale) affixed to an electromagnetic sensor or reference. Another example of this is detection and registration of an instrument (e.g., needle) in the ultrasound imaging plane and the corresponding electromagnetic sensor pose. In some embodiments, the HMD 100 provides native spatial tracking from time-of-flight cameras, simultaneous localization and mapping, and one or more electromagnetic sensors.

II. Data Processing

Figure 4:
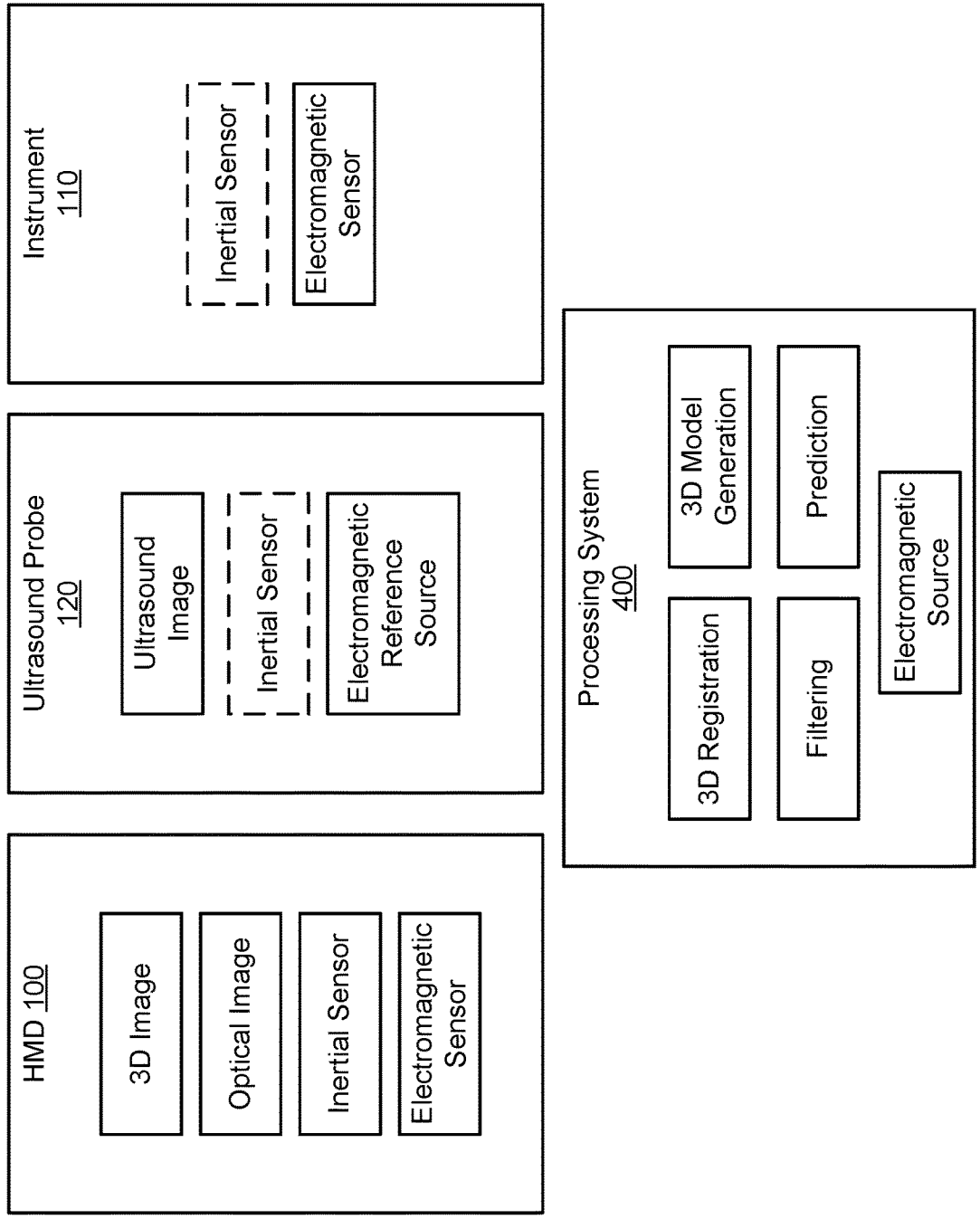
FIG. 4 is a block diagram of the system environment of FIG. 1 according to various embodiments.

FIG. 4 is a block diagram of the system environment of FIG. 1 according to various embodiments. The HMD 100 includes multiple sensors for registration at the local scale. This includes any number of 3D image sensors (e.g., depth camera and LiDAR), optical image sensors (2D camera), inertial sensors, and electromagnetic sensors. The ultrasound probe 120 includes an ultrasound image sensor, an electromagnetic reference source, and an optional inertial sensor. The instrument 110 includes an optional inertial sensor and one or more electromagnetic sensors. In some embodiments, the processing system 400 uses EM sensor data from one or more electromagnetic reference sources different than the electromagnetic reference source coupled to the ultrasound probe 120. For example, another electromagnetic reference source may be a stationary source in the system environment.

The processing system 400 combines and calculates local scale transforms for each device (i.e., HMD 100, ultrasound probe 120, and instrument 110) using calibration and filtering data. The processing system 400 additionally combines multiple device estimations to update transforms as well as calibration and filtering parameters for each local device, between devices, and between sensor frames of reference. By using different filters, the processing system 400 can reduce local scale noise (at the device level) and global scale noise, which enables the processing system 400 to distinguish between measurement errors and actual movement of devices such as the HMD 100 and instrument 110. Two example calibration processes include geometric constraint calibration and hand-eye calibration.

Geometric constraint calibration uses known morphologies such as rotation of the instrument about a pivot point. In various embodiments, the processing system 400 uses geometric constraint calibration to account for the offset distance between the location of a tip of the instrument 110 and the location of an EM sensor coupled to the instrument 110. The offset exists because the EM sensor is not necessarily coupled to the tip, which is tracked for a medical procedure.

Registration of surface of 3D information is achieved using registration algorithms such as iterative closest points (ICP) or may be registered from 2D to 3D using statistical registration metrics such as mutual information or feature based approaches such as Scale-Invariant Feature Transform (SIFT) or Speeded Up Robust Features (SURF) on rendered 3D data. Position and orientation information may be interpolated using information from different temporal rates using filtering techniques such as Kalman filtering or particle filtering. Parameters of estimation from filtering techniques (e.g., unscented Kalman filtering) may be used to estimate and correct rigid transformations between sensors of the same modality (e.g., electromagnetic sensor to electromagnetic sensor) or between modalities (e.g., electromagnetic source reference to optical tracker reference).

Hand-eye calibration (also referred to as "robot-world" or "robot-sensor" calibration) algorithms may also improve updated estimates to update solutions for moment arms between each sensor. In various embodiments, the processing system 400 uses hand-eye calibration to map a coordinate system to a different coordinate system. Since the processing system 400 receives data from multiple sensors and devices that have different coordinate systems, the processing system 400 performs one or more mappings to aggregate the data from the multiple sources.

In hand-eye calibration, the processing system 400 may process each parameter and transform estimate using a filtering algorithm or ensemble of filtering algorithms to smooth responses when transforms are updated. These may include linear quadratic estimators, extended Kalman filters, and unscented Kalman filters individually or combined and forward predicted using a particle filter. These components provide a current best estimate model of the sensed objects within the current estimated model of the environment.

The extraction of an instrument position in ultrasound image and instrument EM pose may be used to update the calibration filter between image plane and instrument position. Additionally, this information may be used to update parameters of the ultrasound image, including frequency, depth, and tissue density with respect to the speed of the propagating ultrasound wave.

In various embodiments, the processing system 400 uses tissue depth to account for any measurement errors due to variations in the speed of sound through different media. Since ultrasound imaging is based on time-of-travel of ultrasound waves propagating through a medium (e.g., tissue), different tissue depth or density can affect an instrument's intersect point predicted by the processing system 400. During calibration, the processing system 400 can use a correction factor associated with a specific medium or density to reduce any speed of sound measurement errors.

Figure 5:
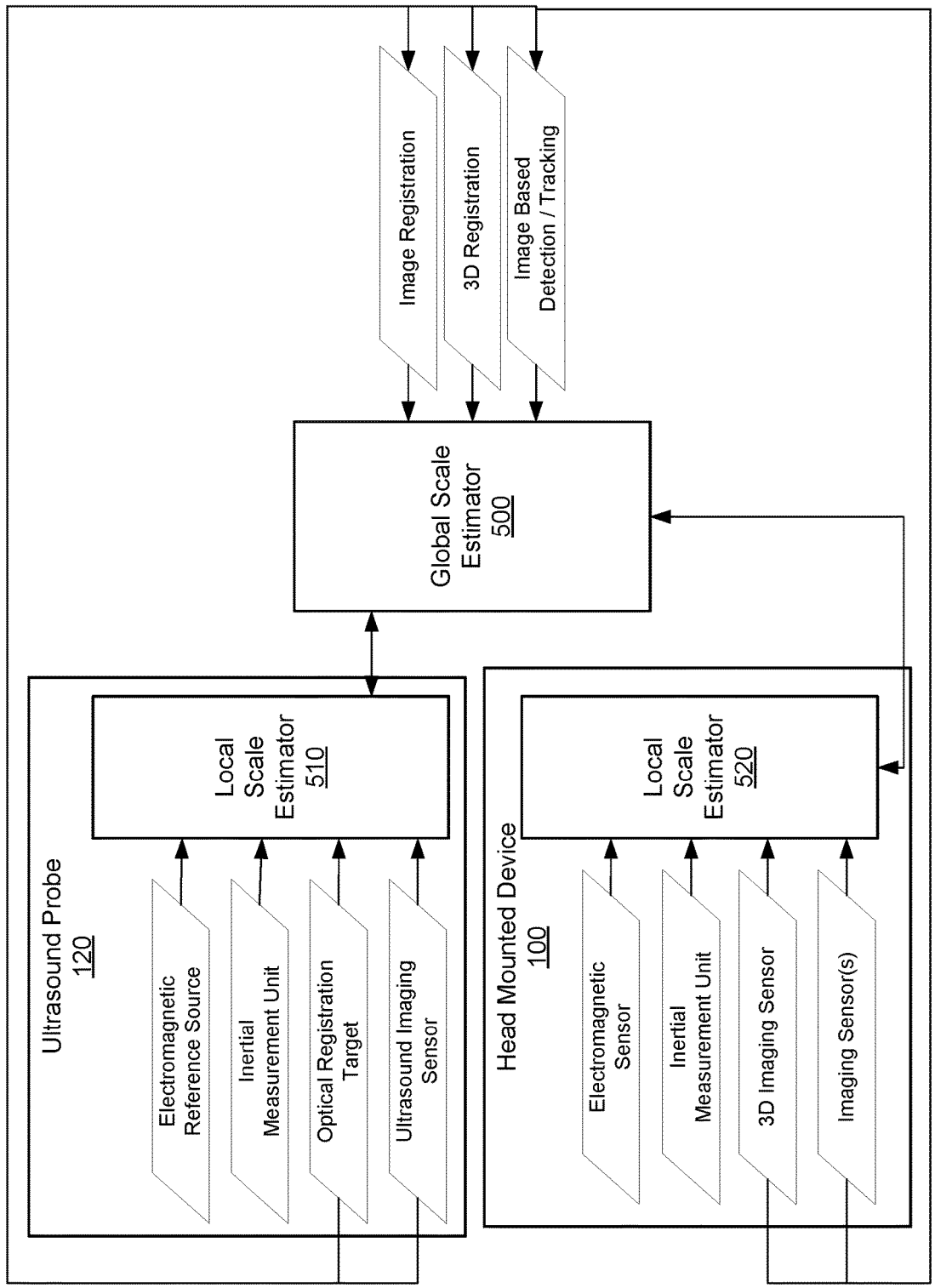
FIG. 5 is a data flow diagram of the processing system according to various embodiments.

FIG. 5 is a data flow diagram of the processing system 400 according to various embodiments. The processing system 400 includes a global scale estimator 500 that aggregates image registration data, 3D registration data, and image-based detection and tracking data from multiple devices, i.e., the HMD 100 and ultrasound probe 120. The ultrasound probe 120 has a local scale estimator 510 that processes data from one or more of the EM reference source, IMU, optical registration target, and ultrasound imaging sensor. The HMD 100 has a local scale estimator 520 that processes data from one or more of the EM sensor, IMU, 3D imaging sensor, and other types of imaging sensors. Using the global scale estimator 500 in combination with the local scale estimators 510 and 520, the processing system 400 can simultaneously solve for the different positions and orientations of multiple devices relative to each other. For example, the processing system 400 determines the position and orientation of the HMD 100 relative to the ultrasound probe 120. Additionally, the processing system 400 determines the position and orientation of one or more instruments 110 relative to the ultrasound probe 120.

In some embodiments, the processing system 400 correlates point data from individual (local) tracking systems using matching methods such as Iterative Closest Point (ICP). With this method, the processing system 400 determines point correspondences between data using the current best known time correspondence and geometric transform between each coordinate system to provide an error and update to the time correspondence and geometric transforms.

In another embodiment, the processing system 400 uses sensed data between sensors from different distances and orientations to calculate the transformation from each measurement frame of reference. One example of this is the registration of ultrasound information from different positions and poses. Another example of this is the registration of 3D volume or surface information from the HMD 100 and ultrasound information. 3D information may be directly sensed using sensors such as time-of-flight optical sensing, preprocedural CT or MRI, or derived using algorithms such as structure from motion (SFM) and simultaneous localization and mapping (SLAM).

In various embodiments, the processing system 400 calculates the transform between each of these devices using predicted transformations. These transformations are interpolated between updates or predicted forward using filtering such as particle filtering and/or Kalman filtering. These transformations are updated using measured rigid transformations, and estimated transformations from sensed information. These transformations may be updated using 3D registration such as ICP or 3D to 2D techniques such as MI or SIFT/SURF. 3D data may be calculated from 2D data using SFM or SLAM from sensed ultrasound from the probe or optical imagery from the HMD. 2D data may calculated from 3D using physics-based rendering into optical or ultrasound imagery.

Each device calculates a local scale of transformations between each of the sensors to provide pose estimates for each device in a consistent local frame of reference in a Local Scale Estimator. The processing system 400 calculates global scale transformations between the local scale data by combining data from multiple Local Scale Estimators and computing transforms. Additionally, the Global Scale Estimator 500 may calculate updated transforms between frames of reference used in Local Scale Estimators to update pose estimations.

III. Example User Interfaces

Figure 6:
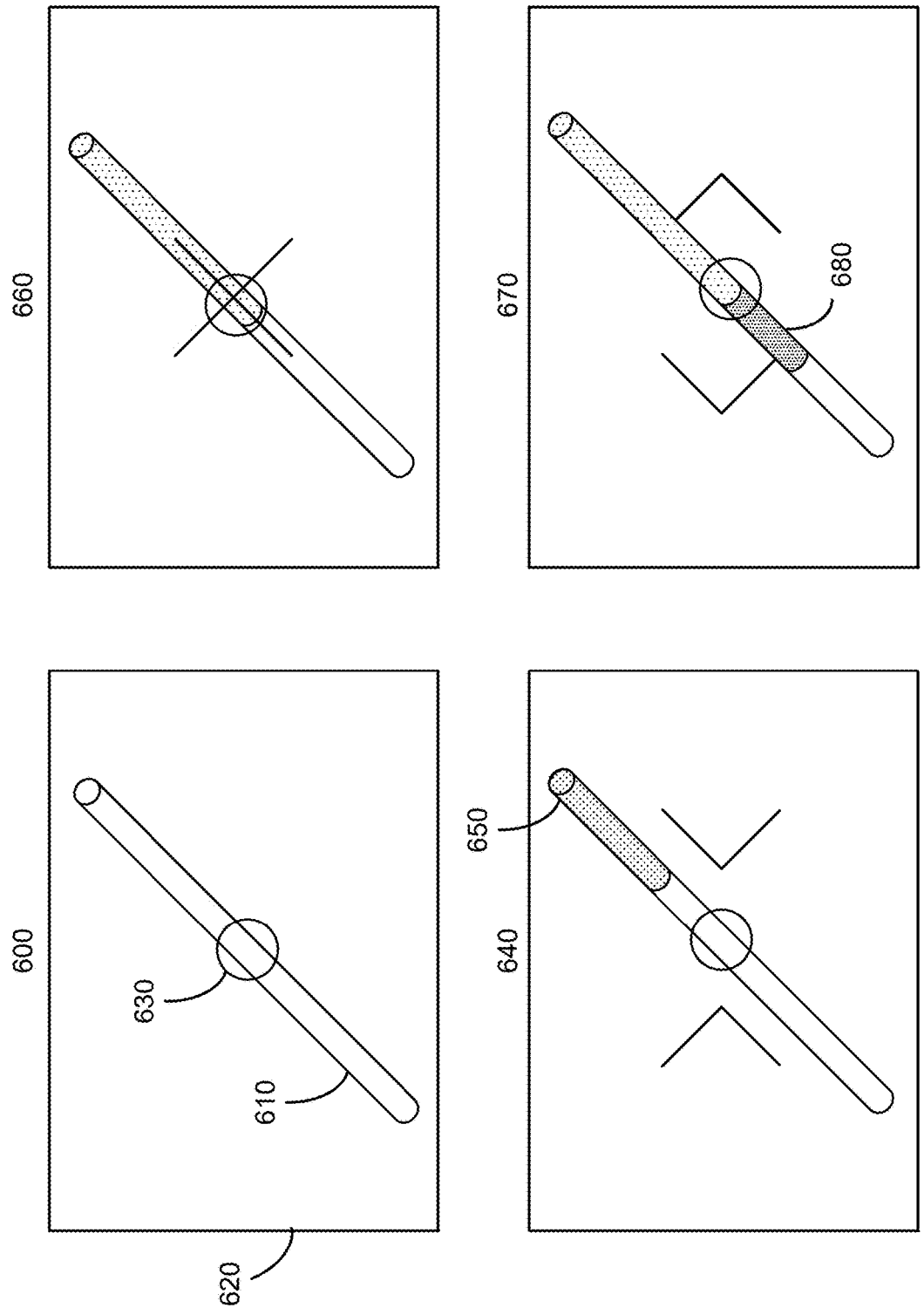
FIG. 6 illustrates example graphical user interfaces for navigating an instrument according to various embodiments.

FIG. 6 illustrates example graphical user interfaces for navigating an instrument according to various embodiments. In the illustrated example use case, a user is navigating a needle instrument 110 to a target intersection point, for example, on a vein or another body part of a patient.

Panel 600 shows a user interface depicting the instrument path indicator 610 overlaid in 3D when the instrument tip is outside of a threshold distance from the ultrasound image plane 620. The instrument path indicator 610 is the projected trajectory of the instrument. The processing system 400 updates the instrument path indicator 610 based on sensor data, for example, to reflect any changes in position or orientation in response to user control of the instrument. The marker 630 depicts the projected intersection point of the instrument path indicator 610 on the ultrasound image plane 620. The instrument path indicator 610 is filled with a default color (or lack of color, e.g., transparent). In the example shown in FIG. 6, the instrument path indicator 610 is depicted as a cylinder and the marker 630 is depicted as a circle; however, in other embodiments, the instrument path indicator 610 and marker 630 may be depicted using other types of shapes or graphics. The user interface may also include other types of 2D or 3D annotations.

Panel 640 depicts the instrument path indicator 610 when the instrument tip is between the threshold distance from the ultrasound image plane 620 but has not yet intersected with the ultrasound image plane 620. The distance between the left angle bracket and right angle bracket is proportional to the distance between the instrument tip and the ultrasound image plane 620. The portion 650 of the instrument path indicator 610 filled with the "in front of plane color" is proportional to the distance that the instrument has navigated beyond the threshold distance from the ultrasound image plane 620. The remainder of the instrument path indicator 610 is filled with the default color. The point of each angle bracket is pointing towards the intersection point, indicating the instrument path indicator 610 is directed toward the ultrasound image plane 620. In the example shown in FIG. 6, the left angle bracket and right angle brackets are depicted as a right angles; however, in other embodiments, this pair of indicators may be depicted using other angles or types of shapes or graphics.

Panel 660 shows the user interface when the instrument tip reaches the point of intersection with the ultrasound image plane 620. The left and right angle brackets intersect at the center of the marker 630. The proportion of the instrument path indicator 610 shaded with the "in front of plane color" is one half in the example shown in FIG. 6. The remainder of the instrument path indicator 610 is filled with the default color.

Panel 670 shows the user interface when the instrument tip has navigated beyond the ultrasound image plane 620. The vertex of each angle bracket is pointing away from the intersection point and marker 630, indicating the instrument path is pointed away the ultrasound image plane 620. The proportion of the instrument path indicator 610 shaded with the "in front of plane color" remains one half, as also shown in panel 660 of this example. The portion 680 of the instrument path indicator 610 shaded with the darker "behind plane color" is proportional to the distance of the instrument tip beyond the ultrasound image plane 620. The remainder of the instrument path indicator 610 is filled with the default color.

Figure 7:
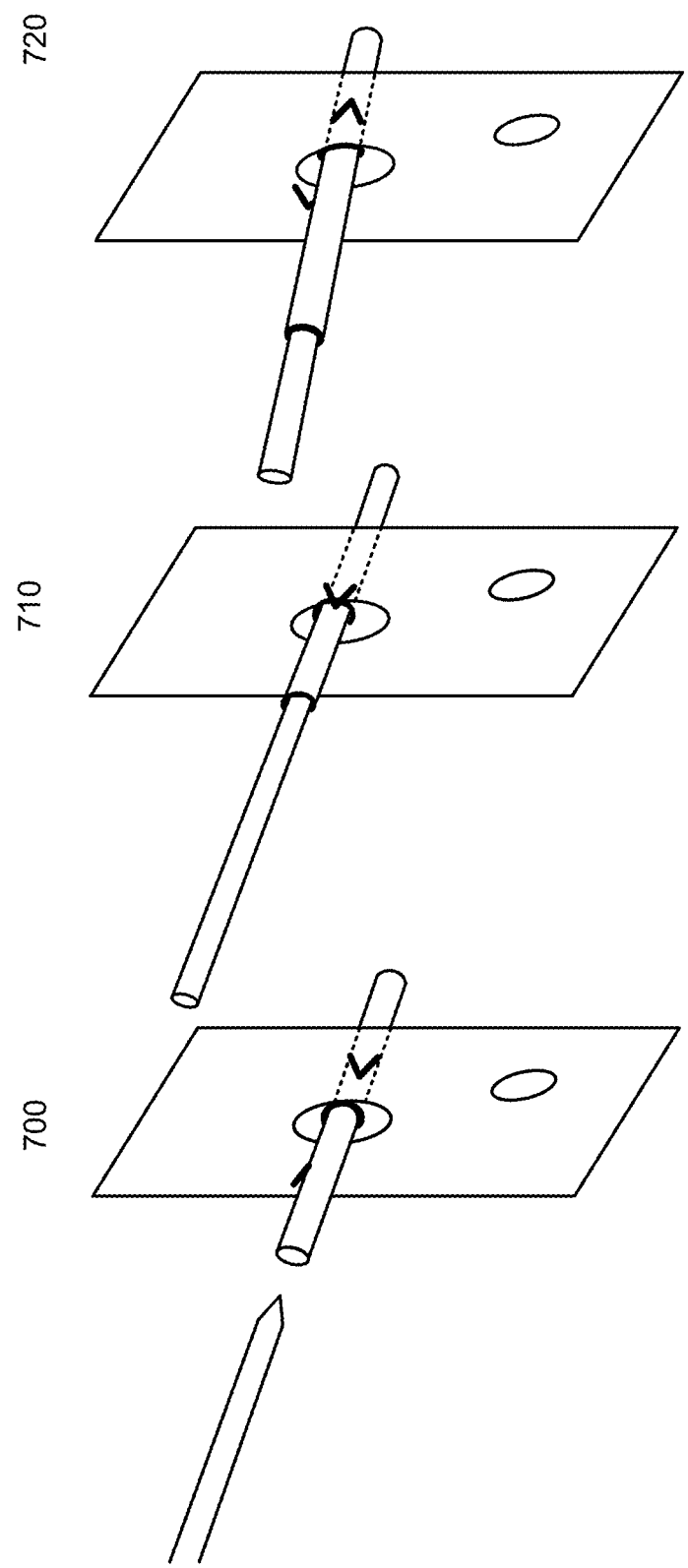
FIG. 7 illustrates additional example graphical user interfaces for navigating an instrument according to various embodiments.

FIG. 7 illustrates additional example graphical user interfaces for navigating an instrument according to various embodiments. Panel 700 corresponds to the scenario shown in panel 600 of FIG. 6 when the instrument tip is outside of a threshold distance from the ultrasound image plane. Panel 710 corresponds to the scenario shown in panel 660 of FIG. 6 when the instrument tip reaches the point of intersection with the ultrasound image plane. Panel 720 corresponds to the scenario shown in panel 670 of FIG. 6 when the instrument tip has navigated beyond the ultrasound image plane.

Figure 8:
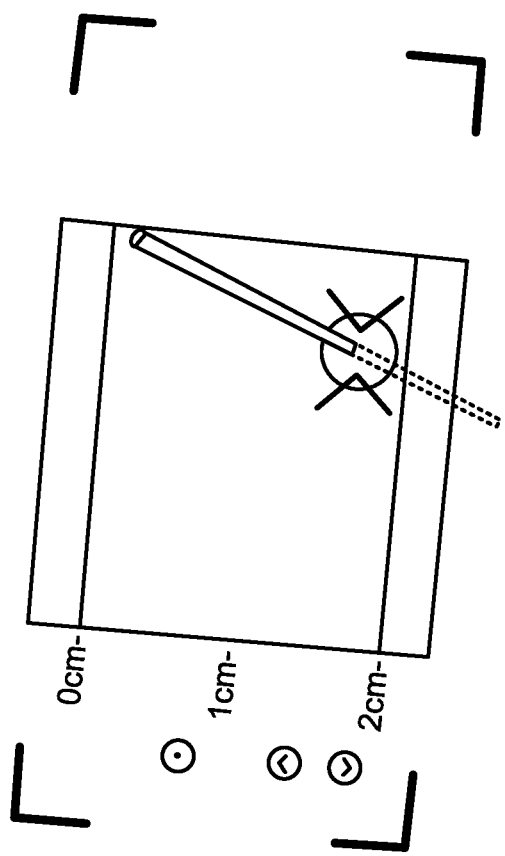
FIG. 8 shows a heads-up display for navigating an instrument according to various embodiments.

FIG. 8 shows a heads-up display for navigating an instrument according to various embodiments. The processing system 400 updates the heads-up display (presented by an HMD 100 to a user) based on the location of the instrument tip. For example, the displays of the instrument path indicator, left angle bracket, and right angle brackets are updated according to the different scenarios previously described with respect to FIG. 6.

IV. Example Process Flows

FIG. 9 is a flowchart of a process 900 for tracking an instrument using multiple sensors according to various embodiments. The processing system 400 may use the process 900 to provide visual guidance to a user wearing an HMD 100 and controlling an instrument 110.

In step 910, the processing system 400 receives data from a first electromagnetic sensor coupled (e.g., rigidly coupled) to an HMD 100 and detecting an electromagnetic field generated by an electromagnetic reference source coupled (e.g., rigidly coupled) to an ultrasound probe 120. In step 920, the processing system 400 receives data from a second electromagnetic sensor coupled (e.g., rigidly coupled) to a medical instrument 110 and detecting the electromagnetic field. In various embodiments, the first electromagnetic sensor and the second electromagnetic sensor are wireless. That is, the electromagnetic sensors are not hard wired to the electromagnetic reference source. The system environment can include any number of additional wireless electromagnetic sensors. The system environment can also include mounting accessories for coupling the electromagnetic sensors to other devices such as the HMD 100, ultrasound probe 120, and medical instrument 110. In various embodiments, the processing system 400 aggregates data from the electromagnetic sensors with data captured by other sensors such as one or more IMUs, depth sensors, or cameras.

In step 930, the processing system 400 determines a position of the HMD 100 relative to the ultrasound probe 120 by processing the data from the first electromagnetic sensor. In step 940, the processing system 400 determines a position of the medical instrument 110 relative to the ultrasound probe 120 by processing the data from the second electromagnetic sensor.

In step 950, the processing system 400 generates a visualization of a path of the medical instrument 110 oriented relative to an ultrasound image plane based at least in part on the position of the HMD 100 and the position of the medical instrument 110.

In step 960, the processing system 400 provides a graphic for display by the HMD 100 to a user wearing the HMD 100. The graphic includes the visualization and image data captured by the ultrasound probe 120 displayed on the ultrasound image plane.

Figure 10:
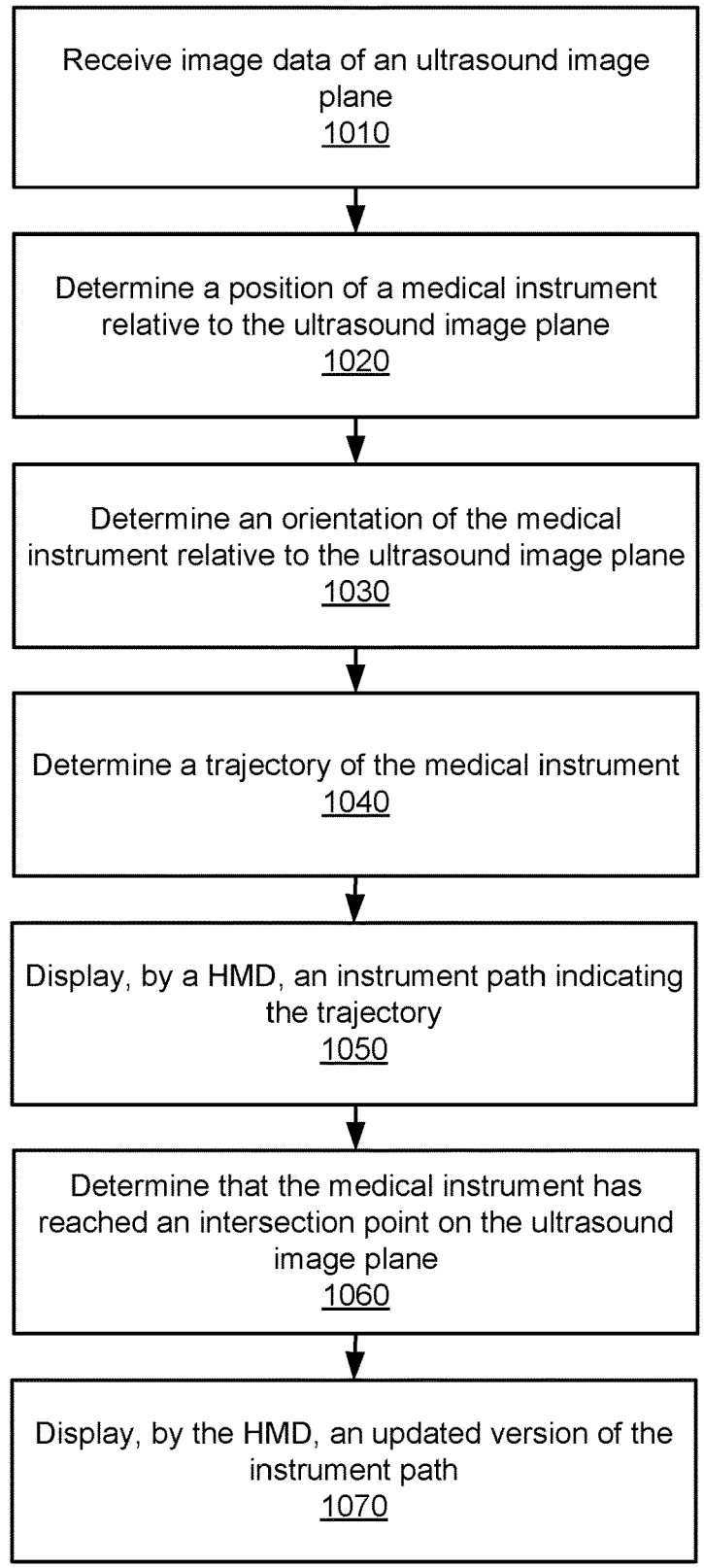
FIG. 10 is a flowchart of a process for navigating an instrument according to various embodiments.

FIG. 10 is a flowchart of a process 1000 for navigating an instrument according to various embodiments. The processing system 400 may use the process 1000 to provide visual guidance to a user wearing an HMD 100 and controlling an instrument 110.

In step 1010, the processing system 400 receives image data of an ultrasound image plane. The image data is captured by the ultrasound probe 120 or another ultrasound imaging sensor. In step 1020, the processing system 400 determines a position of a medical instrument 110 relative to the ultrasound image plane. In step 1030, the processing system 400 determines an orientation of the medical instrument 110 relative to the ultrasound image plane. In step 1040, the processing system 400 determines a trajectory of the medical instrument 110 based on the position and the orientation of the medical instrument 110.

In step 1050, the HMD 100 displays an instrument path indicating the trajectory of the medical instrument 110. In step 1060, the processing system 400 determines that the medical instrument 110 has reached an intersection point on the ultrasound image plane based on an updated position of the medical instrument 110 along the trajectory. In step 1070, the HMD 100 displays an updated version of the instrument path indicating that the medical instrument 110 has reached the intersection point on the ultrasound image plane.

V. Alternative Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving electromagnetic sensor data from a first electromagnetic sensor and a second electromagnetic sensor coupled to a head-mounted display (HMD) at a fixed distance apart, wherein the first electromagnetic sensor and the second electromagnetic sensor detect an electromagnetic field generated by an electromagnetic reference source coupled to an ultrasound probe;
receiving electromagnetic sensor data from a third electromagnetic sensor coupled to a medical instrument and detecting the electromagnetic field;
processing, by one or more processors, the electromagnetic sensor data from the first electromagnetic sensor and the second electromagnetic sensor to determine a position and orientation of the HMD relative to the ultrasound probe;
processing, by the one or more processors, the electromagnetic sensor data from the third electromagnetic sensor to determine a position of the medical instrument relative to the ultrasound probe;
providing a graphic for display by the HMD to a user wearing the HMD, the graphic including a visualization of a path of the medical instrument oriented relative to an ultrasound image plane and image data captured by the ultrasound probe displayed on the ultrasound image plane, wherein the visualization is generated based at least in part on the position and the orientation of the HMD and the position of the medical instrument, wherein the visualization is displayed with a color, and wherein the visualization assists the user with navigating the medical instrument to an intersection point on the ultrasound image plane;
displaying, by the HMD, a first indicator at a first distance from a second indicator, wherein the first distance is proportional to a second distance between a tip of the medical instrument and the intersection point, and wherein the first indicator and the second indicator are centered about the intersection point;
responsive to determining that the tip of the medical instrument is at the intersection point on the ultrasound image plane, displaying the first indicator and the second indicator at the intersection point; and
responsive to determining that the medical instrument has navigated past the intersection point on the ultrasound image plane, updating a portion of the visualization of the path past the intersection point to be displayed by the HMD with a different color.

2. The method of claim 1, further comprising:
determining the orientation of the HMD based on a differential signal between the first electromagnetic sensor and the second electromagnetic sensor by processing the electromagnetic sensor data from the first electromagnetic sensor and the second electromagnetic sensor.

3. The method of claim 1, wherein the orientation of the HMD is further determined based on data captured by an inertial measurement unit of the HMD.

4. The method of claim 1, further comprising:
determining an orientation of the medical instrument by aggregating data captured by an inertial measurement unit of the medical instrument and the electromagnetic sensor data from the third electromagnetic sensor.

5. The method of claim 1, further comprising:
determining a position of the ultrasound probe by processing image data captured by an imaging sensor of the HMD, wherein the graphic is displayed to the user at an offset from the position of the ultrasound probe.

6. The method of claim 1, further comprising:
determining an offset distance between the tip of the medical instrument and a position of the third electromagnetic sensor coupled to the medical instrument, wherein the visualization is generated based on the offset distance.

7. The method of claim 1, further comprising:
determining a first transformation to map a first coordinate system of the medical instrument to a second coordinate system of the ultrasound probe; and
determining a second transformation to map a third coordinate system of the HMD to the second coordinate system of the ultrasound probe,
wherein the visualization is generated using the first transformation and the second transformation.

8. A non-transitory computer-readable storage medium storing instructions, the instructions when executed by one or more processors cause the one or more processors to:
receive electromagnetic sensor data from a first electromagnetic sensor coupled to a medical instrument and detecting the electromagnetic field generated by an electromagnetic reference source coupled to an ultrasound probe;
process the electromagnetic sensor data from the first electromagnetic sensor to determine a position of the medical instrument relative to the ultrasound probe;
provide a graphic for display by a head-mounted display (HMD), the graphic including a visualization of a path of the medical instrument oriented relative to an ultrasound image plane and image data captured by the ultrasound probe displayed on the ultrasound image plane, wherein the visualization is generated based at least in part on the position of the medical instrument, wherein the visualization assists with navigating the medical instrument to an intersection point on the ultrasound image plane, and wherein the visualization is displayed with a color;
display, by the HMD, a first indicator at a first distance from a second indicator, wherein the first distance is proportional to a second distance between a tip of the medical instrument and the intersection point, and wherein the first indicator and the second indicator are centered about the intersection point;
responsive to determining that the tip of the medical instrument is at the intersection point on the ultrasound image plane, display the first indicator and the second indicator at the intersection point; and responsive to determining that the medical instrument has navigated past the intersection point on the ultrasound image plane, update a portion of the visualization of the path past the intersection point to be displayed by the HMD with a different color.

9. The non-transitory computer-readable storage medium of claim 8, comprising further instructions when executed by the one or more processors cause the one or more processors to:

receive electromagnetic sensor data from a second electromagnetic sensor and a third electromagnetic sensor coupled to the HMD at a fixed distance apart, wherein the second electromagnetic sensor and the third electromagnetic sensor detect the electromagnetic field generated by the electromagnetic reference source coupled to the ultrasound probe; and determine an orientation of the HMD based on a differential signal between the second electromagnetic sensor and the third electromagnetic sensor by processing the electromagnetic sensor data from the second electromagnetic sensor and the third electromagnetic sensor.

10. The non-transitory computer-readable storage medium of claim 9, wherein the orientation of the HMD is further determined based on data captured by an inertial measurement unit of the HMD.

11. The non-transitory computer-readable storage medium of claim 8, comprising further instructions when executed by the one or more processors cause the one or more processors to:

determine an orientation of the medical instrument by aggregating data captured by an inertial measurement unit of the medical instrument and the electromagnetic sensor data from the first electromagnetic sensor.

12. The non-transitory computer-readable storage medium of claim 8, comprising further instructions when executed by the one or more processors cause the one or more processors to:

determine a position of the ultrasound probe by processing image data captured by an imaging sensor of the HMD, wherein the graphic is displayed at an offset from the position of the ultrasound probe.

13. The non-transitory computer-readable storage medium of claim 8, comprising further instructions when executed by the one or more processors cause the one or more processors to:

determine an offset distance between the tip of the medical instrument and a position of the first electromagnetic sensor coupled to the medical instrument, wherein the visualization is generated based on the offset distance.

14. The non-transitory computer-readable storage medium of claim 8, comprising further instructions when executed by the one or more processors cause the one or more processors to:

determine a first transformation to map a first coordinate system of the medical instrument to a second coordinate system of the ultrasound probe; and determine a second transformation to map a third coordinate system of the HMD to the second coordinate system of the ultrasound probe, wherein the visualization is generated using the first transformation and the second transformation.

15. A system comprising:

an electromagnetic reference source configured to be coupled to an ultrasound probe and generate an electromagnetic field;

a first electromagnetic sensor configured to be coupled to a head-mounted display (HMD) and detect the electromagnetic field;

a second electromagnetic sensor configured to be coupled to the HMD at a fixed distance apart from the first electromagnetic sensor and detect the electromagnetic field;

a third electromagnetic sensor configured to be coupled to a medical instrument and detect the electromagnetic field; and a non-transitory computer-readable storage medium storing instructions, the instructions when executed by one or more processors cause the one or more processors to:

process the electromagnetic sensor data from the first electromagnetic sensor and the second electromagnetic sensor to determine a position and orientation of the HMD relative to the ultrasound probe;

process the electromagnetic sensor data from the third electromagnetic sensor to determine a position of the medical instrument relative to the ultrasound probe;

provide a graphic for display by the HMD to a user wearing the HMD, the graphic including a visualization of a path of the medical instrument oriented relative to an ultrasound image plane and image data captured by the ultrasound probe displayed on the ultrasound image plane, wherein the visualization is generated based at least in part on the position and the orientation of the HMD and the position of the medical instrument, wherein the visualization is displayed with a color, and wherein the visualization assists with navigating the medical instrument to an intersection point on the ultrasound image plane;

display, by the HMD, a first indicator at a first distance from a second indicator, wherein the first distance is proportional to a second distance between a tip of the medical instrument and the intersection point, and wherein the first indicator and the second indicator are centered about the intersection point;

responsive to determining that the tip of the medical instrument is at the intersection point on the ultrasound image plane, display the first indicator and the second indicator at the intersection point; and responsive to determining that the medical instrument has navigated past the intersection point on the ultrasound image plane, update a portion of the visualization of the path past the intersection point to be displayed by the HMD with a different color.

16. The system of claim 15, further comprising the ultrasound probe, the HMD, and the medical instrument.

17. The system of claim 15, wherein the first electromagnetic sensor, the second electromagnetic sensor, and the third electromagnetic sensor are wireless.

18. The system of claim 15, wherein the medical instrument is a needle, cannula, biopsy device, or ablation device.

* * * * *